United States Patent
Weerawarna

(10) Patent No.: US 8,641,863 B2
(45) Date of Patent: Feb. 4, 2014

(54) CATALYTIC CARBOXYLATION OF CELLULOSE FIBERS IN A CONTINUOUS PROCESS WITH MULTIPLE ADDITIONS OF CATALYST, SECONDARY OXIDANT AND BASE TO A MOVING SLURRY OF CELLULOSE FIBERS

(75) Inventor: S. Ananda Weerawarna, Seattle, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 0 days.

(21) Appl. No.: 13/604,331

(22) Filed: Sep. 5, 2012

(65) Prior Publication Data

US 2013/0081768 A1    Apr. 4, 2013

Related U.S. Application Data

(60) Provisional application No. 61/541,753, filed on Sep. 30, 2011.

(51) Int. Cl.
*D21C 9/00* (2006.01)

(52) U.S. Cl.
USPC .............................................. 162/9

(58) Field of Classification Search
USPC ............... 162/9, 52, 57, 60, 67, 72; 8/181
See application file for complete search history.

(56) References Cited

U.S. PATENT DOCUMENTS

| | | |
|---|---|---|
| 6,379,494 B1 | 4/2002 | Jewell et al. |
| 6,471,824 B1 | 10/2002 | Jewell |
| 6,524,348 B1 | 2/2003 | Jewell et al. |
| 6,582,557 B2 | 6/2003 | Jewell |
| 6,592,717 B2 | 7/2003 | Jewell |
| 6,919,447 B2 | 7/2005 | Komen et al. |
| 7,001,483 B2 | 2/2006 | Severeid et al. |
| 7,109,325 B2 | 9/2006 | Komen et al. |
| 7,135,557 B2 | 11/2006 | Weerawarna et al. |
| 2005/0028292 A1 | 2/2005 | Weerawarna et al. |
| 2005/0028953 A1 | 2/2005 | Severeid et al. |

*Primary Examiner* — Mark Halpern
(74) *Attorney, Agent, or Firm* — Weyerhaeuser Law Dept; Timothy M. Whalen

(57) ABSTRACT

Manufacturing carboxylated fiber by catalytically carboxylating cellulose fiber in at least two catalytic carboxylation stages in series in which a primary catalyst and secondary oxidizing agent and, if necessary, pH adjustment agent is added at the beginning of each stage.

11 Claims, 1 Drawing Sheet

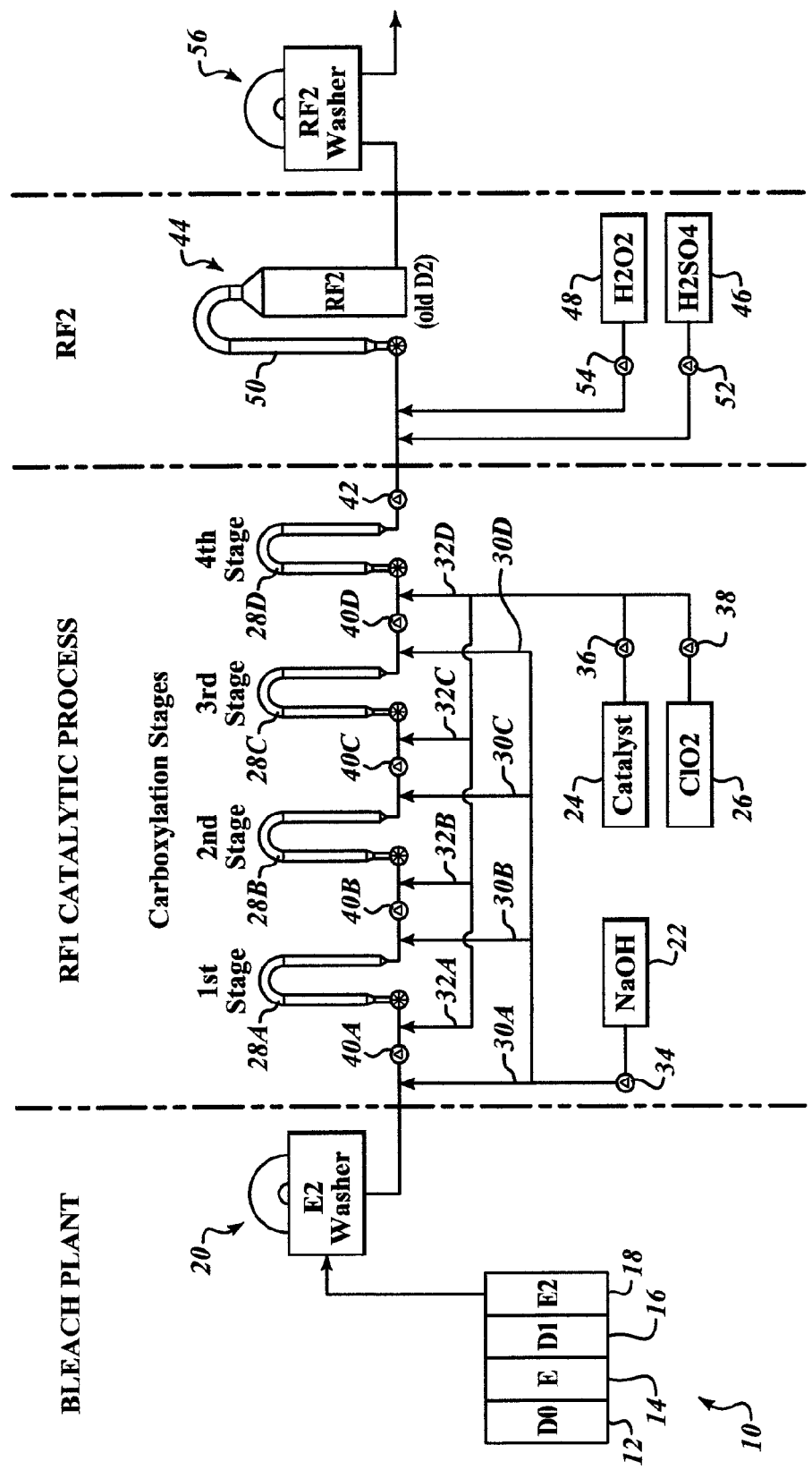

CATALYTIC CARBOXYLATION OF CELLULOSE FIBERS IN A CONTINUOUS PROCESS WITH MULTIPLE ADDITIONS OF CATALYST, SECONDARY OXIDANT AND BASE TO A MOVING SLURRY OF CELLULOSE FIBERS

CROSS-REFERENCE TO RELATED APPLICATION

This application is entitled to and claims the benefit of priority under 35 U.S.C. §119 from U.S. Provisional Patent Application Ser. No. 61/541,753 filed Sep. 30, 2011, and titled CATALYTIC CARBOXYLATION OF CELLULOSE FIBERS IN A CONTINUOUS PROCESS WITH MULTIPLE ADDITIONS OF CATALYST, SECONDARY OXIDANT AND BASE TO A MOVING SLURRY OF CELLULOSE FIBERS the contents of which are incorporated herein by reference.

FIELD OF THE INVENTION

The present invention is a process for preparation of fibrous carboxylated carbohydrates having available primary hydroxyl groups.

BACKGROUND OF THE INVENTION

In one embodiment of carboxylating cellulose fiber bleached cellulose wood pulp fiber is carboxylated in an aqueous slurry or suspension is oxidized by addition of a primary oxidizer comprising a cyclic nitroxide lacking any hydrogen substitution on either of the carbon atoms adjacent the nitroxide nitrogen. Nitroxides having both five and six membered rings have been found to be satisfactory. Both five and six membered rings may have either a methylene group or another heterocyclic atom selected from nitrogen, or oxygen at the four position in the ring, and both rings may have substituent groups at this location.

The nitroxide catalyst added to the reaction medium is rapidly converted to the oxammonium salt (primary oxidant) by chlorine dioxide. The oxammonium ion then binds to a primary hydroxyl group or a hydrated aldehyde hydroxyl group of an anhydroglucose unit of cellulose on a cellulose fiber. In one proposed literature reaction mechanism a hydroxide ion then abstracts a proton thus breaking a carbon-hydrogen bond at the 6-position of the anhydroglucose unit undergoing oxidation. A molecule of hydroxylamine form of the nitroxide is generated with the formation of each aldehyde group from a primary alcohol group or formation of each carboxyl group from a hydrated aldehyde group. The hydroxylamine form then has to be converted to the nitroxide form by a single electron transfer to a chlorine dioxide molecule. The nitroxide form of the catalyst then has to be converted (oxidized) to the oxammonium salt form (active catalyst and primary oxidant) by a single electron transfer to chlorine dioxide. In each case chlorine dioxide is reduced to chlorite ion.

The nitroxides may be formed in situ by oxidation of the respective hydroxylamines or amines. Oxammonium salts of nitroxides are generated by oxidation of nitroxides in situ by the secondary oxidant. Oxammonium salt of the nitroxide is the primary oxidant as well as the active catalyst for carboxylation of cellulose. Oxammonium salts are generally unstable and have to be generated in situ from more stable nitroxide, hydroxylamine or amine precursors. The nitroxide is converted to an oxammonium salt then undergoes reduction to a hydroxylamine during the cellulose carboxylation reactions, The oxammonium salt is continuously regenerated by the presence of a secondary oxidant. In one embodiment chlorine dioxide is the secondary oxidant. Since the nitroxide is not irreversibly consumed in the oxidation reaction only a small amount of it is required. During the course of the reaction it is the secondary oxidant which will deplete.

Two elements have been of concern: length of reaction time to provide the required carboxylation and the amount of retention storage capacity in the catalytic carboxylation reactor required for that reaction time. A longer reaction time requires more retention storage capacity in the catalytic carboxylation reactor.

If added carboxyl level of 2-12 milliequivalents per 100 g of oven dry (OD) cellulose fiber (meq/100 g) is desired a single short reaction time and minimum retention storage capacity is generally sufficient.

The problem is to provide increased levels of carboxylation in a cost effective manner.

BRIEF DESCRIPTION OF THE DRAWINGS

FIG. 1 is a diagram of a four stage carboxylation system.

DETAILED DESCRIPTION OF THE INVENTION

The present invention is to achieve high levels of carboxylation (18-100 meq/100 g) in a fast flowing continuous process using multiple catalytic carboxylation reactors with short reaction times (under 5 minutes) and therefore lowest retention storage volumes.

The process provides additional carboxyl groups to the bleached cellulose wood pulp fiber to provide a carboxylated cellulose wood pulp fiber. The starting material is a bleached cellulose wood pulp fiber. Bleached cellulose wood pulp fibers typically have a carboxyl content of 5 or below meq/100 g. Some uses of carboxylated cellulose wood pulp fiber require high levels of carboxylation. The present process is a method of providing those high levels of carboxylation. In one embodiment the process provides a cellulose wood pulp fiber has a total carboxyl content of up to 150 meq/100 g. In another embodiment the process provides a cellulose wood pulp fiber has a total carboxyl content of up to 100 meq/100 g. In another embodiment the process provides a cellulose wood pulp fiber has a total carboxyl content of up to 70 meq/100 g. In another embodiment the process provides a cellulose wood pulp fiber has a total carboxyl content of up to 50 meq/100 g. In another embodiment the cellulose wood pulp fiber has a total carboxyl content of up to 40 meq/100 g. In another embodiment the cellulose wood pulp fiber has a total carboxyl content of 25 to 30 meq/100 g.

The wood for the wood pulp fibers may be any softwood or hardwood such as pine, spruce, larch, Douglas fir, fir, hemlock, cedar, redwood, aspen, basswood, beech, birch, cottonwood, gum, maple, ash, chestnut, elm, or eucalyptus. It may be pulped by any standard pulping process such as kraft or sulfite. The wood pulp fiber is bleached by any standard bleaching process.

The bleached cellulose wood pulp fiber is then carboxylated. The cellulose fiber in an aqueous slurry or suspension is first oxidized by addition of a primary oxidizer comprising a cyclic nitroxide lacking any hydrogen substitution on either of the carbon atoms adjacent the nitroxide nitrogen. Nitroxides having both five and six membered rings have been found to be satisfactory. Both five and six membered rings may have either a methylene group or another heterocyclic atom selected from nitrogen or oxygen at the four position in the ring, and both rings may have substituent groups at this location. It is important that the nitroxide chosen be stable in an aqueous alkaline environment in the range of about pH 8-11.

A large group of nitroxide compounds have been found to be suitable. 2,2,6,6-Tetramethylpiperidinyl-1-oxy free radical (TEMPO) is among the exemplary nitroxides found useful. Another suitable product linked in a mirror image relationship to TEMPO is 2,2,2'2',6,6,6',6'-octamethyl-4,4'-bipiperidinyl-1,1'-dioxy di-free radical (BI-TEMPO). Similarly, 2,2,6,6-tetramethyl-4-hydroxypiperidinyl-1-oxy free radical; 2,2,6,6-tetramethyl-4-methoxypiperidinyl-1-oxy free radical; and 2,2,6,6-tetramethyl-4-benzyloxypiperidinyl-1-oxy free radical; 2,2,6,6-tetramethyl-4-aminopiperidinyl-1-oxy free radical; 2,2,6,6-tetramethyl-4-acetylaminopiperidinyl-1-oxy free radical; and 2,2,6,6-tetramethyl-4-piperidone-1-oxy free radical are examples of compounds with substitution at the 4 position of TEMPO that have been found to be very satisfactory oxidants. Among the nitroxides with a second hetero atom in the ring at the four position (relative to the nitrogen atom), 3,3,5,5-tetramethyl-morpholine-1-oxy free radical (TEMMO) is very useful.

The nitroxides are not limited to those with saturated rings. One compound found to be a very effective oxidant is 3,4-dehydro-2,2,6,6-tetramethyl-piperidinyl-1-oxy free radical.

Six membered ring compounds with double substitution at the four position have been especially useful because of their relative ease of synthesis and lower cost. Exemplary among these are the ethylene, propylene, and neopentyl cyclic acetals of 2,2,6,6-tetramethyl-4-piperidone-1-oxy free radical.

Among the five membered ring products, 2,2,5,5-tetramethyl-pyrrolidinyl-1-oxy free radical has been found to be very effective.

The above named compounds should only be considered as exemplary among the many representatives of the nitroxides suitable for use.

The nitroxides may be formed in situ by oxidation of the hydroxylamines of any of the nitroxide free radical products. Oxammonium salts of the nitroxides are the active form of catalyst or the primary oxidant in the catalytic oxidation reactions. The oxammonium salts must be generated from nitroxides and nitroxides from hydroxylamines and hydroxylamines from respective amines by chlorine dioxide, a secondary oxidant. The catalyst is usually available as the stable nitroxide or its amine precursor. In one embodiment chlorine dioxide is the secondary oxidant. Since the nitroxide is not irreversibly consumed in the oxidation reaction only a small amount of it is required. During the course of the reaction it is the secondary oxidant which will be depleted. In one embodiment the amount of nitroxide required is in the range of about 0.005% to 1.0% based on cellulose present. In another embodiment the amount of nitroxide required is about 0.02-0.25%. The nitroxide is known to preferentially oxidize the primary hydroxyl located on C-6 of the anhydroglucose moiety of cellulose.

The nitroxide may first be premixed with a portion of an aqueous chlorine dioxide to form a homogeneous solution before addition to the cellulose fiber slurry. Ultrasonic agitation may be useful to increase dissolution rate. The carboxylation reaction may be allowed to continue over a time period from about 10 seconds to 5 minutes. In one embodiment the temperatures is from 0 to 75° C. In other embodiments the temperature is 0° to 50° C. In another embodiment the temperature is room temperature. Following the oxidation reaction, if maximum D.P. (degree of polymerization) stability is desired, the cellulose is optionally washed and reslurried in water where it is subjected to the action of a stabilizing reagent to convert substituent groups, such as aldehydes and ketones, to hydroxyl or carboxyl groups. Unstabilized nitroxide oxidized pulps have objectionable color reversion and will self crosslink upon drying, thereby reducing their ability to redisperse.

The temperature of the reaction will depend on some competing considerations. A higher temperature will increase the reaction rate but will reduce the D.P. of the cellulose and will degrade chlorine dioxide at high alkaline pH.

Following oxidation, the cellulose is washed to remove any residual chemicals and may then be dried or further processed. If maximum stability and D.P. retention is desired the oxidized product is reslurried in water for treatment with a stabilizing agent. The stabilizing agent may either be a reducing agent or another oxidizing agent. A preferred reducing agent is preferably an alkali metal borohydride. Sodium borohydride ($NaBH_4$) is preferred from the standpoint of cost and availability. However, other borohydrides such as $LiBH_4$, or alkali metal cyanoborohydrides such as $NaBH_3$ CN are also suitable. $NaBH_4$ may be mixed with LiCl to form a very useful reducing agent. When $NaBH_4$ is used for reduction, it should be present in an amount between about 0.1 and 100 g/L. A more preferred amount would be about 0.25-5 g/L and a most preferred amount from about 0.5-2.0 g/L. Based on cellulose the amount of reducing agent should be in the range of about 0.1% to 4% by weight, preferably about 1-3%. Reduction may be carried out at room or higher temperature for a time between 10 minutes and 10 hours, preferably about 30 minutes to 2 hours.

Alkali metal chlorites are preferred oxidizing agents used as stabilizers, sodium chlorite being preferred because of the cost factor. Other compounds that may serve equally well as oxidizers are permanganates, chromic acid, bromine, and silver oxide. A combination of chlorine dioxide and hydrogen peroxide is also a suitable oxidizer when used at the pH range designated for sodium chlorite. Oxidation using sodium chlorite may be carried out at a pH in the range of about 1.5-5, preferably 2-4, at temperatures between about 25°-90° C. for times from about 5 minutes to 50 hours, preferably about 10 minutes to 2 hours. One factor that favors oxidants as opposed to reducing agents is that aldehyde groups on the oxidized cellulose are converted to additional carboxyl groups, thus resulting in a more highly carboxylated product. These stabilizing oxidizers are referred to as "tertiary oxidizers" to distinguish them from the oxammonium salt of the nitroxide/chlorine dioxide primary/secondary oxidizers. The tertiary oxidizer is used in a molar ratio of about 1.0-15 times the presumed aldehyde content of the oxidized cellulose, preferably about 5-10 times. In a more convenient way of measuring the required tertiary oxidizer needed, the preferred sodium chlorite usage should fall within about 0.001 g sodium chlorite/g of fiber to 0.2 g/g, preferably 0.01-0.09 g/g, the chlorite being calculated on a 100% active material basis.

After stabilization is completed, the cellulose is again washed and may be dried if desired. Alternatively, the carboxyl substituents may be converted to other cationic forms beside hydrogen or sodium; e.g., calcium, magnesium, or ammonium.

It had been thought that only one addition of primary oxidant or catalyst at the beginning of the reaction was enough because the regeneration of the primary oxidant would allow it to be reused.

Two elements have been of concern: reaction time and the amount of storage capacity required for the reaction. A longer reaction time requires more storage capacity.

The inventor has discovered that it is more difficult to regenerate the active catalyst (oxammonium salt from hydroxylamine precursor) as the carboxylation reaction continues and that it is more difficult for the regenerated catalyst to find reactive sites on the cellulose as the carboxylation reaction continues.

The inventor discovered that it is necessary to supply both the primary oxidant and the secondary oxidant at intervals if the required carboxylation is to be achieved in a reasonable period of time with reasonable storage capacity for the reaction and to obtain higher carboxylation at reasonable reaction times.

It has been found that some uses require higher levels of carboxyl groups on cellulose fibers, e.g. 20 to 40 or 100 or higher meq/100 g.

Highly carboxylated cellulose fibers may be refined and fibrillated by standard methods to provide fibrillated sheets, net works of micro/nano fibrils or singulated nano or micro fibrils. Highly carboxylated fibers with or without further refining and fibrillation are suitable for use in concrete, cosmetics applications, nutraceutical and pharmaceutical delivery applications, In the following discussion chlorine dioxide is used as the secondary oxidizing agent. Sodium hydroxide and sodium bicarbonate or carbonate is used for pH adjustment and control within a narrow pH range. In one embodiment the pH range is 8-11. In another embodiment the pH range is 9.25-10.5. In an embodiment the temperature range is 40-45° C.

It has been found that in order to achieve high levels of carboxyl groups on cellulose fiber in a short reaction time, the fiber slurry is treated in several catalytic carboxylation reactors with fresh additions of catalyst, secondary oxidizing agent and, a pH adjusting chemical at the entry to each catalytic carboxylation reactor. The active catalyst is the oxammonium ion generated from a hindered cyclic amine compound described above. The nitroxide can be obtained by oxidation of the corresponding hydroxylamine or the amine. The time in each stage and the size of each stage will depend upon the speed of the reaction within the stage. The number of stages will depend upon the amount of carboxylation required. It is estimated that approximately one catalytic carboxylation reactor is required for each 10/meq/100 g addition of carboxyl groups required on cellulose fibers.

The fiber slurry will pass through multiple catalytic carboxylation reactors. There is a fresh addition of catalyst, chlorine dioxide and, if necessary, base (buffer solution containing sodium hydroxide) at the entry to each catalytic carboxylation reactor. The series of catalytic carboxylation reactors can be a main pipe or a series of pipes with valved addition pipes bringing in the chlorine dioxide, catalyst and sodium hydroxide to the pipe. The valves on the addition pipes can be used to change the addition of the carboxylation chemicals in a catalytic carboxylation reactor to the amount of carboxylation required in the catalytic carboxylation reactor.

The oxidized cellulose fiber slurry exiting the last catalytic carboxylation reactor enters a single stabilization tower for the acidic stabilization step.

Catalytic carboxylation process of cellulose fibers in water using a multiple catalytic carboxylation reactors can be used to obtain different levels of carboxylation per 100 g oven dried (OD) fibers. The catalytic process uses hindered nitroxides, their precursor amines or hydroxyl amines to obtain the oxidized oxammonium salt as the primary catalyst. The secondary catalyst is chlorine dioxide. In the catalytic oxidation process suitable level of catalyst and required amount of chlorine dioxide is mixed with cellulose fibers already made alkaline. Cellulose fibers can be alkalized using sodium (or potassium) hydroxide containing buffer solutions, containing carbonate or bicarbonate. One embodiment contains mixtures of aqueous bases containing hydroxide, carbonate and bicarbonate.

Multiple catalytic carboxylation reactors or stages can be placed in series and cellulose fibers carboxylated in a multiple catalytic carboxylation reactor process by adding required amounts of catalyst, chlorine dioxide and alkaline base as the fibers enter each catalytic carboxylation reactor or stage. The number of reaction vessels required depends on the level of carboxylation required. The alkaline pulp slurry is acidified with a suitable acid such as sulfuric acid as it leaves the final catalytic carboxylation reactor. As noted above the reaction vessels can be sections of a pipe or sections of a single pipe with chemical entry points along the pipe for each catalytic carboxylation reactor. The time spent in each catalytic carboxylation reactor or section can be from 10 seconds to 5 minutes. Chlorite ions generated by reduction of chlorine dioxide in each of the catalytic stages stabilize the pulp fibers at acidic pH of 1-3.5 for 1-3 hours. Then in one embodiment the pH is changed to 8-10 by the addition of the base chemical. In another embodiment the pH is changed to 8-9 by the addition of the base chemical.

There is stabilization stage after the carboxylation stages. During the stabilization stage any aldehyde groups remaining in the oxidized cellulose pulp fibers are converted to carboxyl groups. At the end of stabilization stage of the process the fiber slurry is neutralized, washed, dewatered and dried.

In one embodiment the catalytic oxidation may takes place in each catalytic carboxylation reactor during a 10 second to 2 minute dwell time. In another embodiment the catalytic oxidation may take place in each catalytic reaction change in a 10 second to 5 minute dwell time. The aqueous cellulose fiber slurry entering the catalytic reaction chamber is mixed with the nitroxides solution of chlorine dioxide (secondary oxidant). In one embodiment the pH of the mixture is 8-11. In another embodiment the pH of the mixture is 9.25-10.5. Cellulose fiber slurry exiting the final catalytic carboxylation reactor is mixed with dilute sulfuric acid and dilute hydrogen peroxide (pH 3). After catalytic oxidation, pulp fibers containing aldehyde groups and carboxyl groups enter the stabilization tower. Aldehyde groups present in the cellulose fibers are converted to carboxyl groups by chlorite ions under acidic conditions in the stabilization chamber (pH 3). Chlorite ions are generated by reduction of chlorine dioxide in the preceding catalytic reaction chamber. In one embodiment the reaction temperature for the process is 30-50° C. In another embodiment the reaction temperature for the process is 40-45° C.

A diagram of one embodiment of a plant is shown in FIG. 1. The catalytic carboxylation reactors or stages are shown as rounded because the oxidation unit is in this instance placed within an existing bleach plant and space is a consideration. As noted above, the stages could be part of a single pipe if there was enough space.

The last four stages of the bleach plant 10 are shown. These are the first chlorine dioxide unit 12, the extraction stage 14, the second chlorine dioxide unit 16 and the second extraction stage 18. In the acidic chlorine dioxide stages 12 and 16 the chlorine dioxide reacts with the lignin and hemicellulose in the pulp slurry to form a reaction product, and in the alkaline extraction stages 14 and 18 the reaction product is removed by treatment with sodium hydroxide.

The pulp slurry from extraction stage 18 flows to a washer 20 in which the soluble reaction products are removed from the pulp.

The pulp slurry then enters the catalytic carboxylation reactors in which the pulp fiber is treated. Four catalytic carboxylation reactors or stages are shown but there may be as many catalytic carboxylation reactors or stages as are required to obtain the amount of carboxylation needed. The catalytic carboxylation reactors or stages are in series and the pulp slurry flows through them from the first catalytic carboxylation stage through the last catalytic carboxylation stage and then to further processing.

Sodium hydroxide or other base from base supply 22 to adjust pH, catalyst from catalyst supply 24 and chlorine dioxide from secondary oxidant supply 26 are supplied to each of the catalytic carboxylation reactors 28A, 28B, 28C and 28D at the beginning of each stage. The base is supplied at 30A, 30B, 30C and 30D at the entrance to catalytic carboxylation reactors 28A, 28B, 28C and 28D respectively. The primary oxidant, catalyst, and secondary oxidant, chlorine dioxide shown here, are shown as being supplied at 32A, 32B, 32C and 32D at the entrance to catalytic carboxylation reactors 28A, 28B, 28C and 28D respectively. They can be supplied together as shown or separately to the entrance of each oxidation stage.

There is a valve between the each of the supplies and the catalytic carboxylation reactors—valve 34 for base supply 22, valve 36 for catalyst supply 24 and valve 38 for secondary oxidant supply 26 and there are valves 40A, 40B, 40C and 40D at the entrance to each catalytic carboxylation reactor and a valve 42 after the last catalytic carboxylation reactor.

The carboxylated fibers are then stabilized in a stabilization tower 44. A chlorine dioxide tower is shown being used for a stabilization tower. Sulfuric acid from sulfuric acid supply 46 and hydrogen peroxide from hydrogen peroxide source 48 are supplied to the oxidized pulp fibers prior to the fibers entering the upflow section 50 of the stabilization tower 40. Again there is a valve 52 on the outlet of acid supply 46 and a valve 54 at the outlet of peroxide supply 48.

The carboxylated fibers are then neutralized at washer 56 in which the fibers are washed with a sodium hydroxide solution and dewatered.

Example 1

20 g oven dry (OD) of bleached pulp fibers in a 12% aqueous slurry was placed in a polythene bag. 8 g of sodium carbonate (8.0 g) in 290 ml deionized (DI) water was added to the bag and mixed with the fibers. The pulp fiber slurry in the bag was placed in a hot water bath. The initial temperature of the pulp fiber slurry was 40° C. The initial pH of the pulp fiber slurry was 11.11.

Catalytic Stage 1

Then 0.006 g of the catalyst TAA-EGK-NO (triacetoamine ethylene glycol ketal nitroxide) was mixed with 95 ml of 0.53% ClO2 solution and this solution was mixed with the pulp fiber slurry. The chlorine dioxide was depleted in 20 seconds. The yellow color of chlorine dioxide fades away indicating depletion. The final pH of the pulp fiber slurry was 10.20 and the final temperature of the pulp fiber slurry was 40° C.

Stabilization Stage

Then dilute sulfuric acid was added to and mixed with the pulp fiber slurry to lower the pH to 3-3.5. 5 ml of 30% solution of aqueous hydrogen peroxide was then added to the pulp fiber slurry and mixed well. The catalytically oxidized pulp fibers were stabilized at a pH of 3-3.5 and a temperature of 40° C. for 1 hour.

Neutralization

Then 10% aqueous sodium hydroxide solution was added to the pulp fiber slurry to raise the pH to 8. The pulp fiber slurry was then filtered and washed with 500 ml of water. The carboxyl level on the fibers was determined as 15.56 meq/100 g.

Example 2

20 g OD bleached pulp fibers in a 12% aqueous slurry was placed in a polythene bag. 8.0 g of sodium carbonate in 290 ml DI water was added to the bag and mixed with the pulp fibers. The pulp fiber slurry in the bag was placed in a hot water bath. The initial temperature of the pulp fiber slurry was 40° C. The initial pH of the pulp fiber slurry was 11.10.

Catalytic Stage 1

Then 0.006 g of the catalyst TAA-EGK-NO, was mixed with 95 ml of 0.53% ClO2 solution and this solution was mixed with the pulp fiber slurry. The chlorine dioxide was depleted in 15 seconds. The yellow color of chlorine dioxide fades away indicating depletion. The final pH of the pulp fiber slurry was 10.31 and the final temperature of the pulp fiber slurry was 40° C.

Catalytic Stage 2

Then 0.006 g of the catalyst TAA-EGK-NO, was mixed with 95 ml of 0.53% ClO2 solution and this solution was mixed with the pulp slurry. The chlorine dioxide was depleted in 30 seconds. The yellow color of chlorine dioxide fades away indicating depletion. The final pH of the pulp fiber slurry was 9.91 and the final temperature of the pulp fiber slurry was 40° C.

Stabilization Stage

Then dilute sulfuric acid was added to and mixed with the pulp fiber slurry to lower the pH to 3-3.5. 10 ml of 30% solution of aqueous hydrogen peroxide was then added to the pulp fiber slurry and mixed well. The catalytically oxidized pulp fibers were stabilized at a pH of 3-3.5 and a temperature of 40° C. for 1 hour.

Neutralization

Then 10% aqueous sodium hydroxide solution was added to the pulp fiber slurry to raise the pH to 8. The pulp fiber slurry was then filtered and washed with 500 ml of water. The carboxyl level on the fibers was determined as 24.68 meq/100 g.

Example 3

20 g OD of bleached pulp fibers as a 12% aqueous slurry was placed in a polythene bag. 8.0 g of sodium carbonate in 290 ml DI water was added to the bag and mixed with the pulp fibers. The pulp fiber slurry in the bag was placed in a hot water bath. The initial temperature of the pulp fiber slurry was 40° C. The initial pH of the pulp fiber slurry was 11.11.

Catalytic Stage 1

Then 0.006 g of the catalyst TAA-EGK-NO was mixed with 95 ml of 0.53% ClO2 solution and the solution was mixed with the pulp fiber slurry. The chlorine dioxide was depleted in 15 seconds. The yellow color of chlorine dioxide fades away indicating depletion. The final pH of the pulp fiber slurry was 10.21 and the final temperature of the pulp fiber slurry was 40° C.

Catalytic Stage 2

Then 0.006 g of the catalyst TAA-EGK-NO was mixed with 95 ml of 0.53% ClO2 solution and the solution was mixed with the pulp fiber slurry. The chlorine dioxide was depleted in 30 seconds. The yellow color of chlorine dioxide fades away indicating depletion. The final pH of the pulp fiber slurry was 9.81 and the final temperature of the pulp fiber slurry was 40° C.

Catalytic Stage 3

Then 0.006 g of the catalyst TAA-EGK-NO was mixed with 95 ml of 0.53% ClO2 solution and the solution was mixed with the pulp fiber slurry. The chlorine dioxide was depleted in 120 seconds. The yellow color of chlorine dioxide fades away indicating depletion. The final pH of the pulp fiber slurry was 9.31 and the final temperature of the pulp fiber slurry was 40° C.

Stabilization Stage

Then dilute sulfuric acid was added to and mixed with the pulp fiber slurry to lower the pH to 3-3.5. 15 ml of 30% solution of aqueous hydrogen peroxide was also added to and mixed well with the pulp fiber slurry. The catalytically oxidized pulp fibers were stabilized at a pH of 3-3.5 and at 40° C. for 1 hour.

Neutralization

Then a 10% aqueous sodium hydroxide solution was added to the pulp fiber slurry to raise the pH to 8. The pulp fiber slurry was then filtered and washed with 500 ml of water. The carboxyl level on the fibers was determined as 37.39 meq/100 g.

Example 4

20 g OD of bleached pulp fibers as a 12% aqueous slurry was placed in a polythene bag. 8.0 g sodium carbonate in 290 ml DI water was added to and mixed with the pulp fiber slurry in the bag. The pulp fiber slurry in the bag was placed in a hot water bath. The initial temperature of the pulp fiber slurry was 40° C. The initial pH of the pulp fiber slurry was 11.10.

Catalytic Stage 1

Then 0.006 g of the catalyst TAA-EGK-NO was mixed with 95 ml of 0.53% ClO2 solution and the solution mixed with the pulp fiber slurry. The chlorine dioxide was depleted in 20 seconds. The yellow color of chlorine dioxide fades away indicating depletion. The final pH of the pulp fiber slurry was 10.32 and the final temperature of the pulp fiber slurry was 40° C.

Catalytic Stage 2

Then 0.006 g of the catalyst TAA-EGK-NO was mixed with 95 ml of 0.53% ClO2 solution and the solution was mixed with the pulp fiber slurry. The chlorine dioxide was depleted in 35 seconds. The yellow color of chlorine dioxide fades away indicating depletion. The final pH of the pulp fiber slurry was 9.83 and the final temperature of the pulp fiber slurry was 40° C.

Catalytic Stage 3

Then 0.006 g of the catalyst TAA-EGK-NO was mixed with 95 ml of 0.53% ClO2 solution and the solution was mixed with the pulp fiber slurry. The chlorine dioxide was depleted in 60 seconds. The yellow color of chlorine dioxide fades away indicating depletion. The final pH of the pulp fiber slurry was 9.48 and the final temperature of the pulp fiber slurry was 40° C.

Catalytic Stage 4

Then 0.006 g of the catalyst TAA-EGK-NO was mixed with 95 ml of 0.53% ClO2 solution and the solution was mixed with the pulp slurry. The chlorine dioxide was depleted in 20 minutes. The yellow color of chlorine dioxide fades away indicating depletion. The final pH of the pulp fiber slurry was 8.21 and the final temperature of the pulp fiber slurry was 40° C.

Stabilization Stage

Then dilute sulfuric acid was added to and mixed with the pulp fiber slurry to lower the pH to 3-3.5. 20 ml of 30% solution aqueous hydrogen peroxide was also added to and mixed well with the pulp fiber slurry. The catalytically oxidized pulp fibers were stabilized at a pH of 3-3.5 and at a temperature of 40° C. for 1 hour.

Neutralization

Then 10% aqueous sodium hydroxide solution was added to the pulp fiber slurry to raise the pH to 8. The pulp fiber slurry was then filtered and washed with 500 ml of water. The carboxyl level on the fibers was determined as 43.32 meq/100 g.

Example 5

20 g OD of bleached pulp fibers as a 12% aqueous slurry was placed in a polythene bag. 4.0 g sodium bicarbonate and 1.0 g sodium hydroxide in 266 ml water was added to and mixed with the pulp fiber slurry in the bag. The pulp fiber slurry in the bag was placed in a hot water bath. The initial temperature of the pulp fiber slurry was 52° C. The initial pH of the pulp fiber slurry was 10.6.

Catalytic Stage 1

Then 0.006 g of the catalyst TAA-EGK-NO was mixed with 100 ml of 0.88% ClO2 solution and the solution mixed with the pulp fiber slurry. The chlorine dioxide was depleted in 15 seconds. The yellow color of chlorine dioxide fades away indicating depletion. The final pH of the pulp fiber slurry was 9.6 and the final temperature of the pulp fiber slurry was 41.5° C.

Catalytic Stage 2

The pulp slurry was heated to 46.5° C. and sodium hydroxide 0.5 g was added and mixed (pH=10.7). Then 100 ml of 0.88% ClO2 solution and the solution was mixed with the pulp fiber slurry. The chlorine dioxide was depleted in 34 seconds. The yellow color of chlorine dioxide fades away indicating depletion. The final pH of the pulp fiber slurry was 9.7 and the final temperature of the pulp fiber slurry was 41.5° C.

Catalytic Stage 3

The pulp slurry was heated to 48.5° C. and sodium hydroxide 0.5 g was added and mixed (pH=10.1). Then 0.006 g of the catalyst TAA-EGK-NO was mixed with 100 ml of 0.88% ClO2 solution and the solution was mixed with the pulp fiber slurry. The chlorine dioxide was depleted in 43 seconds. The yellow color of chlorine dioxide fades away indicating depletion. The final pH of the pulp fiber slurry was 9.3 and the final temperature of the pulp fiber slurry was 39.5° C.

Catalytic Stage 4

The pulp slurry was heated to 48.0° C. and sodium hydroxide 0.75 g was added and mixed (pH=10.3). Then 0.006 g of the catalyst TAA-EGK-NO was mixed with 95 ml of 0.53% ClO2 solution and the solution was mixed with the pulp slurry. The chlorine dioxide was depleted in 71 seconds. The yellow color of chlorine dioxide fades away indicating depletion. The final pH of the pulp fiber slurry was 9.2 and the final temperature of the pulp fiber slurry was 38.0° C.

Stabilization Stage

Then dilute sulfuric acid was added to and mixed with the pulp fiber slurry to lower the pH to 3-3.5. 20 ml of 30% solution aqueous hydrogen peroxide was also added to and mixed well with the pulp fiber slurry. The catalytically oxidized pulp fibers were stabilized at a pH of 3-3.5 and at a temperature of 40° C. for 1 hour.

Neutralization

Then 10% aqueous sodium hydroxide solution was added to the pulp fiber slurry to raise the pH to 8. The pulp fiber slurry was then filtered and washed with 500 ml of water. The carboxyl level on the fibers was determined as 43.23 meq/100 g.

The following tables present representative examples.

In the following Tables 1 through 5, 20 g OD of northern softwood kraft pulp (NSKP) was carboxylated in one or more catalytic stages as shown. The total DI water was 450 ml. The control pulp had an initial carboxyl content of 4.18 meq/100 g of pulp.

Table 1 has examples performed at a temperature of 40° C. and using TAA-EGK-NO (NO). The NO is given as the % on fiber for each stage. It includes examples 1-4.

TABLE 1

NSKP (GP) 40° C.

| Ex | NaHCO₃ g | Na₂CO₃ G | Initial pH | NO | 1st stage | 2nd stage | 3rd stage | 4th stage | Total time sec | Carboxyl on fiber meq/100 g |
|---|---|---|---|---|---|---|---|---|---|---|
| 1 | | 8 | 11.28 | 0.03 | 95<br>0.53<br>10.6<br>20 | | | | 20 | 15.6 |
| 2 | | 8 | 11.1 | 0.03 | 95<br>0.53<br>10.31<br>15 | 95<br>0.53<br>10.31<br>30 | | | 45 | 24.68 |
| 3 | | 8 | 11.11 | 0.03 | 95<br>0.53<br>10.21<br>15 | 95<br>0.53<br>9.81<br>30 | 95<br>0.53<br>9.31<br>120 | | 165 | 37.39 |
| 4 | | 8 | 11.1 | 0.03 | 95<br>0.53<br>10.32<br>20 | 95<br>0.53<br>9.83<br>35 | 95<br>0.53<br>9.48<br>60 | 95<br>0.53<br>8.21<br>1200 | 1315 | 43.32 |
| 5 | | 8 | 11.1 | 0.03 | 60N<br>0.48<br>10.71<br>10 | 60N<br>0.48<br>10.32<br>15 | | | 25 | 13.4 |
| 6 | 3 | 6 | 9.88 | 0.03 | 60N<br>0.48<br>9.50<br>20 | 60N<br>0.48<br>9.25<br>40 | 60N<br>0.48<br>9.10<br>75 | | 135 | 16.8 |
| 7 | | 8 | 11.28 | 0.03 | 60N<br>0.48<br>10.66<br>15 | 60N<br>0.48<br>10.31<br>15 | 60N<br>0.48<br>10.11<br>25 | | 55 | 18.35 |
| 8 | 4 | 7 | 10.01 | 0.05 | 60<br>0.76<br>9.8<br>15 | 60<br>0.76<br>9.72<br>15 | 60<br>0.76<br>9.6<br>15 | | 45 | 20.96 |
| 9 | | 16 | 11.08 | 0.03 | 95<br>0.53<br>10.52<br>15 | 95<br>0.53<br>10.17<br>30 | 95<br>0.53<br>9.94<br>35 | | 80 | 29.83 |
| 10 | | 16 | 11.1 | 0.03 | 95<br>0.53<br>10.46<br>20 | 95<br>0.53<br>10.43<br>25 | 95<br>0.53<br>9.93<br>45 | 95<br>0.53<br>9.72<br>85 | 175 | 38.72 |

Table 2 has examples performed at a temperature of 30° C. and using TAA-EGK-NO (NO). The NO is given as the % on fiber for each stage.

TABLE 2

NSKP (GP) 30° C.

| Ex | NaHCO₃ g | Na₂CO₃ G | Initial pH | NO | 1st stage | 2nd stage | 3rd stage | 4th stage | Total time sec | Carboxyl on fiber meq/100 g |
|---|---|---|---|---|---|---|---|---|---|---|
| 11 | 3 | 5 | 10.01 | 0.02 | 60<br>0.76<br>9.84<br>30 | 60<br>0.76<br>9.68<br>45 | | | 75 | 19.52 |
| 12 | 5 | 3 | 9.8 | 0.02 | 60<br>0.76<br>9.5<br>70 | 60<br>0.76<br>9<br>180 | | | 250 | 21.1 |

TABLE 2-continued

| | | | | | NSKP (GP) 30° C. | | | | | |
|---|---|---|---|---|---|---|---|---|---|---|
| | | | | | ClO₂ solution - ml | | | | | |
| | | | | | ClO₂ in solution - % | | | | | |
| | | | | | end_pH | | | | | |
| | | | | | Time min sec | | | | Total | Carboxyl |
| Ex | NaHCO₃ g | Na₂CO₃ G | Initial pH | NO | 1st stage | 2nd stage | 3rd stage | 4th stage | time sec | on fiber meq/100 g |
| 13 | | 8 | 11.36 | 0.02 | 60<br>0.76<br>10.7<br>15 | 60<br>0.76<br>10.5<br>20 | 60<br>0.76<br>10.2<br>45 | | 80 | 23.35 |
| 14 | 5 | 4 | 9.8 | 0.1 | 60<br>0.79<br>9.7<br>30 | 60<br>0.79<br>9.4<br>35 | | | 65 | 23.94 |
| 15 | 5 | 3 | 9.8 | 0.1 | 60<br>0.76<br>9.52<br>40 | 60<br>0.76<br>9.11<br>60 | | | 100 | 24.79 |
| 16 | | 8 | 11.36 | 0.02 | 80<br>0.76<br>10.56<br>25 | 80<br>0.76<br>10.15<br>45 | 80<br>0.76<br>9.82<br>120 | | 190 | 32.6 |

Table 3 has examples performed at a temperature of 35° C. and using TAA-EGK-NO (NO). The NO is given as the % on fiber for each stage.

TABLE 3

| | | | | | NSKP (GP) 35° C. | | | | | |
|---|---|---|---|---|---|---|---|---|---|---|
| | | | | | ClO₂ solution - ml | | | | | |
| | | | | | ClO₂ in solution - % | | | | | |
| | | | | | end_pH | | | | | |
| | | | | | Time min sec | | | | Total | Carboxyl |
| Ex | NaHCO₃ g | Na₂CO₃ G | Initial pH | NO | 1st stage | 2nd stage | 3rd stage | 4th stage | time sec | on fiber meq/100 g |
| 17 | | 8 | 11.2 | 0.02 | 70<br>0.76<br>10.56<br>18 | 70<br>0.76<br>10.15<br>30 | 70<br>0.76<br>9.82<br>70 | | 118 | 29.51 |

Table 4 has examples performed at a temperature of 45° C. and using TAA-EGK-NO (NO). The NO is given as the % on fiber for each stage.

TABLE 4

| | | | | | NSKP - (GP) 45° C. | | | | | |
|---|---|---|---|---|---|---|---|---|---|---|
| | | | | | ClO₂ solution - ml | | | | | |
| | | | | | ClO₂ in solution - % | | | | | |
| | | | | | end_pH | | | | | |
| | | | | | Time min sec | | | | Total | Carboxyl |
| Ex | NaHCO₃ g | Na₂CO₃ G | Initial pH | NO | 1st stage | 2nd stage | 3rd stage | 4th stage | time sec | on fiber meq/100 g |
| 18 | 3 | 6 | 9.88 | 0.03 | 60N<br>0.48<br>9.55<br>15 | 60N<br>0.48<br>9.29<br>20 | 60N<br>0.48<br>9.11<br>35 | | 70 | 11.58 |

Table 5 has examples performed at a temperature of 50° C. and using TAA-EGK-NO (NO). The NO is given as the % on fiber for each stage.

TABLE 5

NSKP (GP) 50° C.

| Ex | NaHCO₃ g | Na₂CO₃ G | Initial pH | NO | 1st stage | 2nd stage | 3rd stage | 4th stage | Total time sec | Carboxyl on fiber meq/100 g |
|---|---|---|---|---|---|---|---|---|---|---|
| 19 | 4 | 6 | 9.77 | 0.005 | 60 / 0.76 / 9.64 / 35 | 60 / 0.76 / 9.48 / 75 | | | 110 | 14.8 |
| 20 | 4 | 7 | 9.82 | 0.005 | 60 / 0.76 / 9.7 / 37 | 60 / 0.76 / 9.52 / 80 | | | 117 | 15.15 |
| 21 | 5 | 4.5 | 9.65 | 0.01 | 60 / 0.76 / 9.42 / 30 | 60 / 0.76 / 9.25 / 30 | | | 60 | 16.46 |
| 22 | 4 | 7 | 9.82 | 0.005 | 60 / 0.76 / 9.70 / 35 | 60 / 0.76 / 9.52 / 45 | | | 80 | 17.2 |
| 23 | 5 | 6 | 9.63 | 0.01 | 60 / 0.76 / 9.5 / 35 | 60 / 0.76 / 9.33 / 68 | | | 103 | 17.27 |
| 24 | 4 | 6 | 9.73 | 0.005 | 60 / 0.76 / 9.64 / 30 | 60 / 0.76 / 9.49 / 35 | | | 65 | 17.33 |
| 25 | 5 | 4.5 | 9.5 | 0.01 | 60 / 0.76 / 9.37 / 35 | 60 / 0.76 / 9.16 / 80 | | | 115 | 17.49 |
| 26 | 5 | 6 | 9.63 | 0.01 | 60 / 0.76 / 9.45 / 30 | 60 / 0.76 / 9.36 / 30 | | | 60 | 17.74 |
| 27 | 5 | 4 | 9.7 | 0.02 | 60 / 0.76 / 9.53 / 20 | 60 / 0.76 / 9.3 / 40 | | | 60 | 20.28 |
| 28 | 4 | 7 | 9.83 | 0.03 | 60 / 0.76 / 9.71 / 10 | 60 / 0.76 / 9.62 / 20 | 60 / 0.76 / 9.47 / 25 | | 55 | 21.02 |
| 29 | | 16 | 11.03 | 0.03 | 95 / 0.53 / 10.42 / 15 | 95 / 0.53 / 10.01 / 25 | 95 / 0.53 / 9.88 / 35 | | 75 | 25.26 |
| 30 | | 16 | 11.01 | 0.03 | 95 / 0.53 / 10.44 / 10 | 95 / 0.53 / 10.06 / 15 | 95 / 0.53 / 9.89 / 30 | 95 / 0.53 / 9.71 / 165 | 220 | 27.89 |

Stage cell values are listed in order: ClO₂ solution - ml / ClO₂ in solution - % / end_pH / Time min sec.

In the following tables 6-8, 20 g OD of west coast pine haft pulp was carboxylated in one or more catalytic stages as shown. The total DI water was 450 ml.

Table 6 has examples performed at a temperature of 30° C. and using TAA-EGK-NO (NO). The NO is given as the % on fiber for each stage.

TABLE 6 pine 30° C.

| Ex | NaHCO$_3$ g | Na$_2$CO$_3$ G | Initial pH | NO | 1$^{st}$ stage | 2$^{nd}$ stage | 3$^{rd}$ stage | 4$^{th}$ stage | Total time sec | Carboxyl on fiber meq/100 g |
|---|---|---|---|---|---|---|---|---|---|---|
| | | | | | ClO$_2$ solution - ml ClO$_2$ in solution - % end_pH Time min sec | | | | | |
| 31 | 5 | 1.5 | 9.6 | 0.2 | 60 0.79 9 35 | 60 0.79 7.6 600 | | | 635 | 23.95 |
| 32 | 2.52 | 5.72 | 10.4 | 0.2 | 60 0.79 10.1 20 | 60 0.79 9.9 20 | | | 40 | 23.97 |
| 33 | 5 | 3 | 9.8 | 0.2 | 60 0.79 9.54 20 | 60 0.79 9.11 40 | | | 60 | 24.79 |
| 34 | 24 | | 8.1 | 0.2 | 60 0.8 7.7 300 | 60 0.8 7.5 300 | 60 0.8 7.5 300 | | 900 | 29.05 |
| 35 | 2.52 | 5.72 | 10.4 | 0.2 | 60 0.8 10.1 20 | 60 0.8 9.9 20 | 60 0.8 9.6 40 | | 80 | 32.18 |
| 36 | 24 | | 8.1 | 0.2 | 60 0.8 7.7 300 | 60 0.8 7.4 300 | 60 0.8 7.5 300 | 60 0.8 7.3 300 | 1200 | 36.65 |
| 37 | 2.52 | 5.72 | 10.4 | 0.2 | 60 0.8 10.1 20 | 60 0.8 9.9 20 | 60 0.8 9.6 30 | 60 0.8 9.2 50 | 120 | 40.26 |

Table 7 has examples performed at a temperature of 40° C. and using TAA-EGK-NO (NO). The NO is given as the % on fiber for each stage. In examples

TABLE 7 pine 40° C.

| Ex | Na$_2$CO$_3$ g | Initial pH | NO | 1$^{st}$ stage | 2$^{nd}$ stage | 3$^{rd}$ stage | 4$^{th}$ stage | Total time sec | Carboxyl on fiber meq/100 g |
|---|---|---|---|---|---|---|---|---|---|
| | | | | NaHCO$_3$ solution - ml[1] NaHCO$_3$ in solution - g[1] ClO$_2$ solution - ml ClO$_2$ in solution - % end_pH Time min sec | | | | | |
| 38 | | 8.2 | 0.2 | 70 4 30 0.8 7.5 300 | | 70 4 30 0.8 7.2 300 | 70 4 30 0.8 7.4 300 | 1200 | 21.88 |
| | | | | | | | 30 0.8 7.3 300 | | |
| 39 | | 8.2 | 0.2 | 70 8 60 0.8 7.5 300 | | 70 10 60 0.8 7.2 300 | 70 4 60 0.8 7.4 300 | 1200 | 33.27 |
| | | | | | | | 60 0.8 7.3 300 | | |

[1]The NaHCO$_3$ addition was before the ClO$_2$ addition in each stage.

Table 8 has examples performed at a temperature of 50° C. and using TAA-EGK-NO (NO). The NO is given as the % on fiber for each stage.

TABLE 8 pine 50° C.

| Ex | NaHCO₃ G | Na₂CO₃ G | Initial pH | NO | 1st stage | 2nd stage | 3rd stage | 4th stage | Total time sec | Carboxyl on fiber meq/100 g |
|---|---|---|---|---|---|---|---|---|---|---|
| | | | | | ClO₂ solution - ml | | | | | |
| | | | | | ClO₂ in solution - % | | | | | |
| | | | | | end_pH | | | | | |
| | | | | | Time min sec | | | | | |
| 40 | 18 | | 8.1 | 0.2 tempo | 60 0.8 7.7 300 | | | | 300 | 10.94 |
| 41 | 18 | | 8.1 | 0.2 | 60 0.8 7.7 300 | | | | 300 | 12.28 |
| 42 | 18 | | 8.1 | 0.2 tempo | 120 0.8 7.5 300 | | | | 300 | 13.04 |
| 43 | 18 | | 8.1 | 0.2 | 120 0.8 7.5 300 | | | | 300 | 14.98 |
| 44 | 18 | | 8.1 | 0.2 | 60 0.8 7.6 300 | 60 0.8 7.6 300 | | | 600 | 22.76 |
| 45 | 18 | | 8.1 | 0.2 tempo | 60 0.8 7.7 300 | 60 0.8 7.4 300 | | | 600 | 22.86 |
| 47 | 18 | | 8.1 | 0.2 | 60 0.8 7.7 300 | 60 0.8 7.5 300 | 60 0.8 7.5 300 | | 900 | 28.97 |
| 49 | 24 | | 8.1 | 0.2 | 60 0.8 7.7 300 | 60 0.8 7.5 300 | 60 0.8 7.3 300 | 60 0.8 7.3 300 | 1200 | 36.98 |

| Ex | Na₂CO₃ g | Initial pH | NO | 1st stage | 2nd stage | 3rd stage | 4th stage | Total time sec | Carboxyl on fiber meq/100 g |
|---|---|---|---|---|---|---|---|---|---|
| | | | | NaHCO₃ solution - ml¹ | | | | | |
| | | | | NaHCO₃ in solution - g¹ | | | | | |
| | | | | ClO₂ solution - ml | | | | | |
| | | | | ClO₂ in solution - % | | | | | |
| | | | | end_pH | | | | | |
| | | | | Time min sec | | | | | |
| 46 | | 8.1 | 0.2 | 70 8 90 0.8 7.5 300 | 70 8 90 0.8 7.2 300 | | | 600 | 25.08 |
| 48 | | 8.2 | 0.2 | 70 8 60 0.8 7.5 300 | 0.8 7.5 300 | 70 8 60 0.8 7.5 300 | | 900 | 30.33 |

¹The NaHCO₃ addition was before the ClO₂ addition in each stage.

The invention claimed is:

1. A method of making a stable fibrous carboxylated cellulose, the method comprising:
carboxylating cellulose wood pulp fibers in an aqueous alkaline suspension by catalytically carboxylating the fibers in at least two catalytic carboxylation stages in which the catalytic carboxylation stages are in series and each later catalytic carboxylation stage further catalytically carboxylates the carboxylated fibers from the previous catalytic carboxylation stage;
wherein the first catalytic carboxylation stage is provided with a precursor of primary oxidant, the active oxammonium salt catalyst, selected from the group consisting of heterocyclic nitroxides, their corresponding hydroxyl amines or their corresponding amines, stable under aqueous alkaline conditions in which the carbon atoms adjacent the nitroxide nitrogen lack hydrogen substitution, and mixtures thereof; a secondary oxidant to regenerate the active catalyst; and a sufficient amount of alkaline material to cause the fibers to be at an alkaline pH of 8-11 at the beginning of the catalytic carboxylation stage to carboxylate the cellulose fibers;

wherein each subsequent catalytic carboxylation stage is provided additional amounts of the active catalyst precursor, the secondary oxidant, and alkaline material to adjust the pH to 8-11 to further carboxylate the cellulose fibers from the previous catalytic carboxylation stage; and wherein the catalytically carboxylated cellulose fibers have a carboxylation level of 18 to 100 meq. per 100 g of oven dry pulp.

2. The method of claim 1 in which the secondary oxidant is chlorine dioxide.

3. The method of claim 1 in which there are 2 to 10 catalytic carboxylation stages.

4. The method of claim 1 in which the precursor of the active oxammonium salt catalyst selected from the group consisting of heterocyclic nitroxides, their corresponding hydroxylamines or their corresponding amines; secondary oxidant to regenerate the active catalyst; and the alkaline material are added at the start of each catalytic carboxylation stage.

5. The method of claim 1 in which the time in each catalytic carboxylation stage is from 10 seconds to 5 minutes.

6. The method of claim 1 in which the temperature at the beginning of each catalytic carboxylation stage is from 25 to 65° C.

7. The method of claim 1 in which the pH at the beginning of each catalytic carboxylation stage is 9-11.

8. The method of claim 1 in which the alkaline material is a combination of sodium hydroxide and sodium bicarbonate or sodium carbonate.

9. The method of claim 1 in which after the last catalytic carboxylation stage the carboxylated fibers are stabilized by further treating them in aqueous suspension with a peroxide stabilizing agent, chlorite stabilization agent, and an acid stabilizing agent.

10. The method of claim 9 in which aldehyde groups on the carboxylated fibers are converted to carboxyl groups.

11. The method of claim 1 in which the carboxylated fibers are fibrillated.

* * * * *